Oct. 23, 1934.  J. C. BOHMKER  1,977,905
INCUBATOR
Filed Dec. 1, 1932  2 Sheets-Sheet 1

Inventor
John C. Bohmker
By Rummler Rummler & Woodworth, Atty.

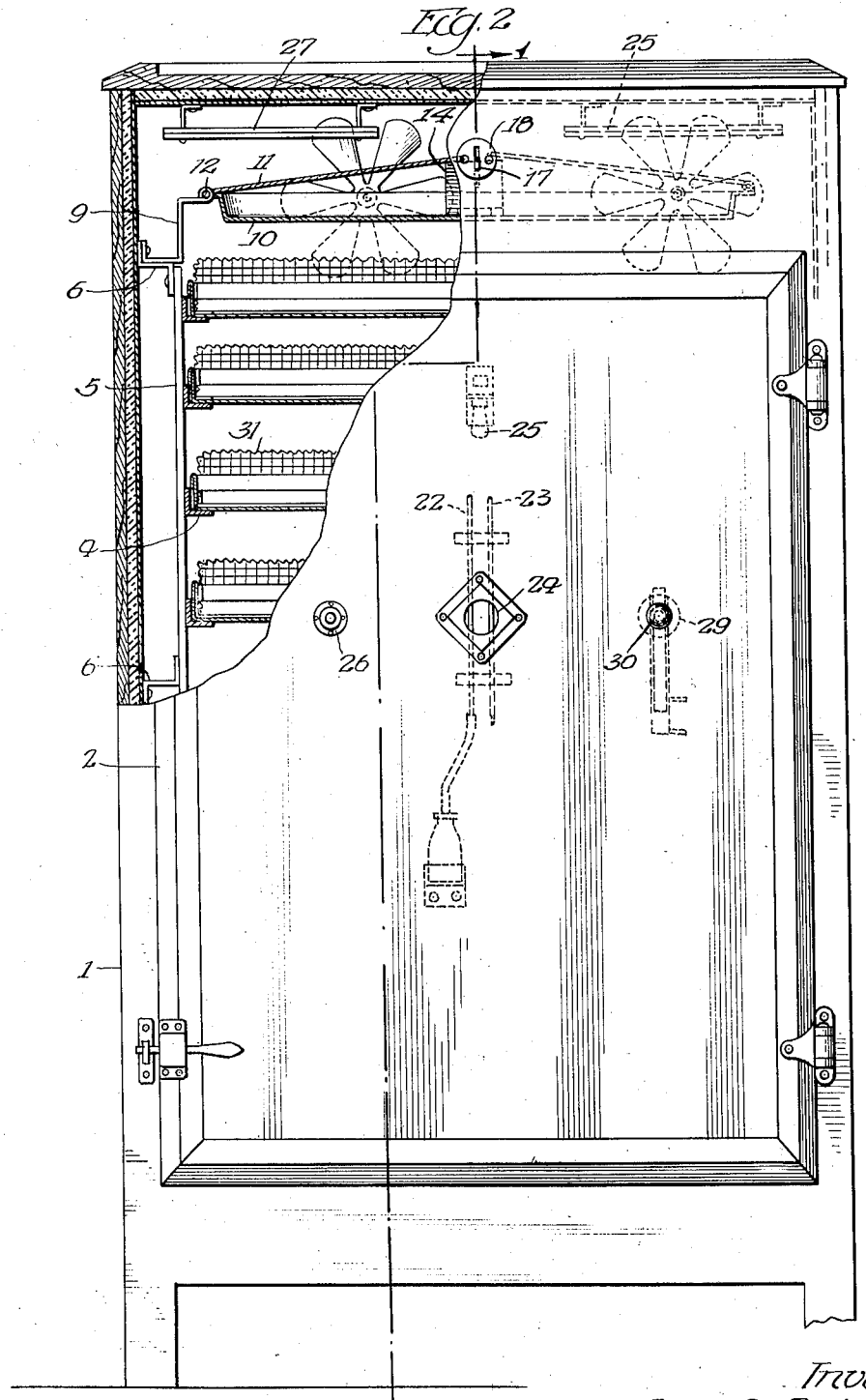

Patented Oct. 23, 1934

1,977,905

UNITED STATES PATENT OFFICE 1,977,905

INCUBATOR

John C. Bohmker, Kankakee, Ill.

Application December 1, 1932, Serial No. 645,211

1 Claim. (Cl. 119—37)

This invention relates to egg hatching equipment of the class described in applicant's Patent No. 1,893,694 on Incubators, issued January 10, 1933, and affords improved means for the regulation of the moisture content of the air which is circulated throughout the egg tray compartment of the incubator.

The purposes of the invention are to provide for exact control of the temperature and humidity of the air used in the process of incubation and to afford convenient means for varying this condition as required during the successive stages of incubation, and to provide for a constant influx of fresh air.

These objects are accomplished by means of a construction such as illustrated in the drawings in which:

Fig. 2 shows the incubator in front elevation and partly in section.

Figure 1:
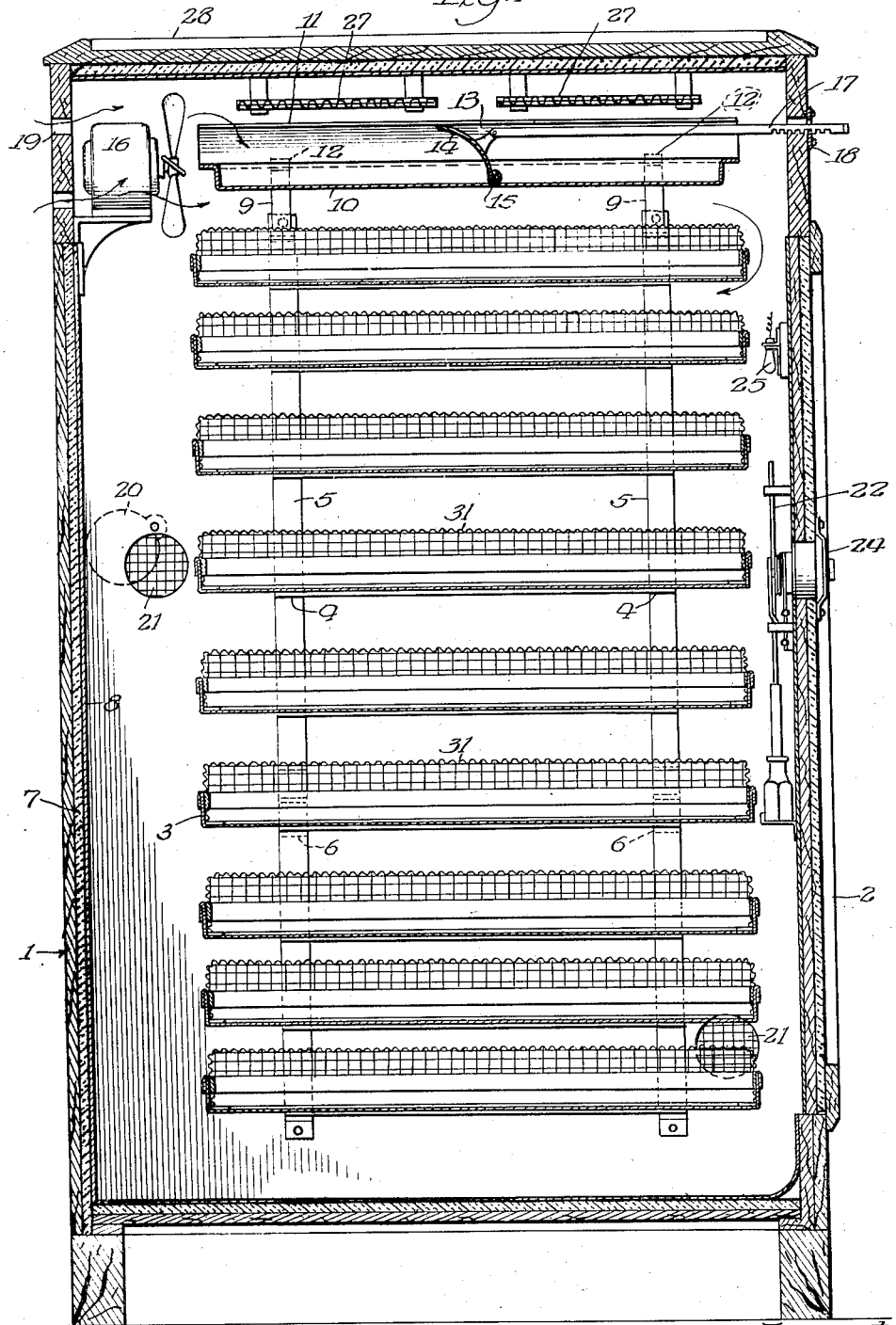
Figure 1 is a longitudinal section in elevation of the incubator taken on the line 1—1 of Fig. 2.

Temperature regulation of the air used in the process of incubation, and the control of the relative humidity of such air, are each most important factors in the development of healthy and large chicks. Proper development can not take place when the air is dry and stagnant, and if the air is too moist for the correct rate of evaporation from the egg the chicks are likely to be strangled by breathing in water at the time of breaking through the membrane which extends across one end of the egg and allows air to enter the tissue-like sac enclosing the chick, and which is broken just before hatching.

In the electrically heated incubator herein described, regulation of humidity is attained by the use of a water receptacle located above the tier of egg trays and between the egg trays and the heating element where it will shield the eggs by intercepting heat waves radiating from the heating elements. The water receptacle is also located in a horizontal air current produced by motor driven circulators mounted at one side of the water receptacle.

The rate of evaporation of water in the receptacle is controlled by an adjustable covering means for the receptacle which controls the flow of air over the surface of the water.

Also bearing upon the subject of humidity regulation is the arrangement of air inlets and outlets in the walls of the incubator, the position and sizes of which have been determined by experiment with the particular apparatus herein illustrated. All air entering the incubator must pass over the motor, thereby performing a twofold function: (a) that of cooling the motor, and (b) that of taking the chill off the air, thus aiding the efficiency of operation. Dry and wet bulb thermometers are mounted upon the inside of the door of the incubator, and the door is provided with a glass covered sight opening and means for illuminating the thermometers.

Aside from the above mentioned features of this construction, the apparatus employed is quite similar in general arrangement and heat regulating means to well known equipment except that the trays are non-uniformly spaced, as determined experimentally, for causing a uniform distribution of air and consequently a balanced temperature throughout the entire egg space of the machine. The trays are also preferably each provided with a screen cover so that the device is suitable for custom hatching without any likelihood of a chick which is hatched from a batch of eggs in one tray making its way to another tray.

By reference to the drawings it may be seen that the incubator consists of a rectangular cabinet 1 provided with a hinged door 2 closing the opening through which the trays 3 are passed. The trays are slidable along angle bars 4 carried by the uprights 5. These uprights are spaced inwardly from the side walls by supporting brackets 6.

The cabinet door is of wood lined with fibrous insulating sheets 7 and an inner lining of sheet metal 8. The metallic uprights 5 also carry supports 9 for the water receptacle 10. This receptacle may be substantially closed by the pair of hinged lids 11, each covering one-half of the receptacle, and hinged at 12 to its sides. At their inner adjacent edges 13 the lids rest upon a curved cam element 14 hinged to the bottom of the receptacle at 15. This cam may be rocked on its pivot for the purpose of adjusting the lids upwardly around the pivots and thus proportionately permitting circulation of air into contact with the inner surface of the water in the receptacle.

The circulating fans 16 are supported on the rear wall of the cabinet in position to direct air currents horizontally over and under the receptacle 10, and also over and under the heating elements 27. It may be seen that with the lids in the angular position shown in Fig. 2, some of the air set in motion by the fans will pass underneath the lids and some will pass over the lids, and the relative flow in this manner may be proportioned by adjustment of cam 14. This cam may be manually adjusted by the slide bar 17 which extends through an aperture in the front of the cabinet. This bar is notched on its lower edge so that it may be retained in set position by the engagement with the edge of a plate 18 through which it passes. The adjustment of bar 17 is made in accordance with the condition of air entering the cabinet through the openings 19 behind the fan and the extent of recirculation within the cabinet as determined by pivoted cover plates 20 for the air outlets 21. The required humidity ranges between 53 and 56 per cent of saturation at incubating temperatures.

The condition of the air is indicated by the wet and dry bulb thermometers 22 and 23 supported on the inner surface of door 2. These thermometers may be observed through the sight opening 24 and are illuminated by an electric lamp 25 under the control of push button switch 26. Electric heating elements 27 are supported by the cabinet top wall 28 above the water receptacle 10 but also in the path of movement of air flow from fans 16. The heating elements thus serve to heat the air, but the water receptacle 10 shields the egg trays from radiant heat emitted by the heaters. The heaters are intermittently operated under the control of an expansion bellows-type thermostat 29 also mounted on door 2 and adjustable as usual by the turn button 30.

Each egg tray is provided with a removable screen cover 31, the purpose of which is to prevent hatched chicks from one tray getting mixed with those in another tray.

In the use of the incubator the operation of fans 16 and temperature regulation is the same as usual in this type of incubator, but the air condition, with reference to humidity, may be closely regulated according to the condition of entering air and the extent of recirculation by means of an adjustment of cam operating rod 17 to bring the wet bulb reading to the required point.

Although but one specific embodiment of this invention has been herein shown and described, it is to be understood that details of the construction shown may be altered or omitted without departing from the spirit of this invention as defined by the following claim:

I claim:

An incubator comprising a cabinet having a vertical tier of egg trays, an electric heating element suspended from the top of said cabinet, a water receptacle positioned below said heating element and above said trays, means for propelling a horizontal flow of air between said heating element and the top of said cabinet, between said water receptacle and heating element and between said water receptacle and the uppermost tray, and means for directing said air flow to regulate the proportion of flowing air which contacts with the water in the receptacle.

JOHN C. BOHMKER.